US012759665B2

(12) United States Patent
Chang

(10) Patent No.: US 12,759,665 B2
(45) Date of Patent: Oct. 13, 2026

(54) SKEWER-WRENCH COMBINATION

(71) Applicant: Shun Xin Bicycle Component Co., Ltd., Taichung City (TW)

(72) Inventor: Chin-Chao Chang, Taichung City (TW)

(73) Assignee: Shun Xin Bicycle Component Co., Ltd., Taichung City (TW)

( * ) Notice: Subject to any disclaimer, the term of this patent is extended or adjusted under 35 U.S.C. 154(b) by 141 days.

(21) Appl. No.: 18/965,159

(22) Filed: Dec. 2, 2024

(65) Prior Publication Data

US 2025/0196966 A1 Jun. 19, 2025

(30) Foreign Application Priority Data

Dec. 15, 2023 (TW) ................................ 112149050

(51) Int. Cl.
*B62K 25/02* (2006.01)
*B25B 15/00* (2006.01)
*B62J 11/22* (2020.01)

(52) U.S. Cl.
CPC ............ *B62K 25/02* (2013.01); *B25B 15/008* (2013.01); *B62J 11/22* (2020.02); *B62K 2206/00* (2013.01)

(58) Field of Classification Search
CPC .. B62K 25/00; B62K 25/02; B62K 2025/025; B62K 2206/00; B60B 27/026; B60B 35/00; B60B 35/04; B25B 15/008; B25B 27/0071; B62J 11/22; F16B 35/00; F16B 35/06
See application file for complete search history.

(56) References Cited

U.S. PATENT DOCUMENTS 9,751,362 B2 * 9/2017 Nakajima ............. B60B 35/109
2003/0089146 A1 * 5/2003 Denby ................... B62K 25/02
70/233
2021/0188396 A1 * 6/2021 Braedt ................... B62K 25/02
2022/0170586 A1 * 6/2022 Johnson, Sr. ........... F16B 35/06

FOREIGN PATENT DOCUMENTS

EP 2591991 A2 * 5/2013 ........... B60B 27/026

* cited by examiner

*Primary Examiner* — Kip T Kotter
*Assistant Examiner* — Taekwon Choi
(74) *Attorney, Agent, or Firm* — Wang Law Firm, Inc.

(57) ABSTRACT

A skewer-wrench combination includes a skewer, a hex key and a compensator. The skewer includes a thread at an end, a non-circular bore in an opposite end, and two grooves in a wall of the non-circular bore. The compensator includes two bent sections fitted in the grooves. The hex key includes a non-circular rod compliant with the non-circular bore. The non-circular rod is smaller than the non-circular bore so that the former is easily insertable in the latter. The non-circular rod is in tight contact with the bent sections of the compensator as the non-circular rod is inserted in the non-circular bore.

2 Claims, 6 Drawing Sheets

SKEWER-WRENCH COMBINATION

BACKGROUND OF INVENTION

1. Field of Invention

The present invention relates to a bicycle and, more particularly, to a skewer-wrench combination for a bicycle.

2. Related Prior Art

Taiwan Patent No. M521680 discloses a conventional quick-release device for a scooter, a bicycle, or an exercise bike for example.

The quick-release device includes a handle (30) including a cam formed at an end and a grip (31) formed at an opposite end. The handle is operable to quickly pull or slacken a skewer (11). Problems are encountered in the use of the quick-release device.

Firstly, the handle must be properly oriented when the handle pulls the skewer. Otherwise, the handle might accidentally be pivoted to slacken the skewer.

Secondly, the quick-release device includes quite a few elements. It is expensive to produce this number of elements. Moreover, it involves a complicated and hence expensive process to assemble the quick-release device.

Therefore, the present invention is intended to obviate or at least alleviate the problems encountered in the prior art.

SUMMARY OF INVENTION

It is an objective of the present invention to provide an easy-to-use and reliable skewer-wrench combination.

To achieve the foregoing objective, the skewer-wrench combination includes a skewer, a hex key and a compensator. The skewer includes a thread at an end, a non-circular bore in an opposite end, and two grooves in a wall of the non-circular bore. The compensator includes two bent sections fitted in the grooves. The hex key includes a non-circular rod compliant with the non-circular bore. The non-circular rod is smaller than the non-circular bore so that the former is easily insertable in the latter. The non-circular rod is in tight contact with the bent sections of the compensator as the non-circular rod is inserted in the non-circular bore.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
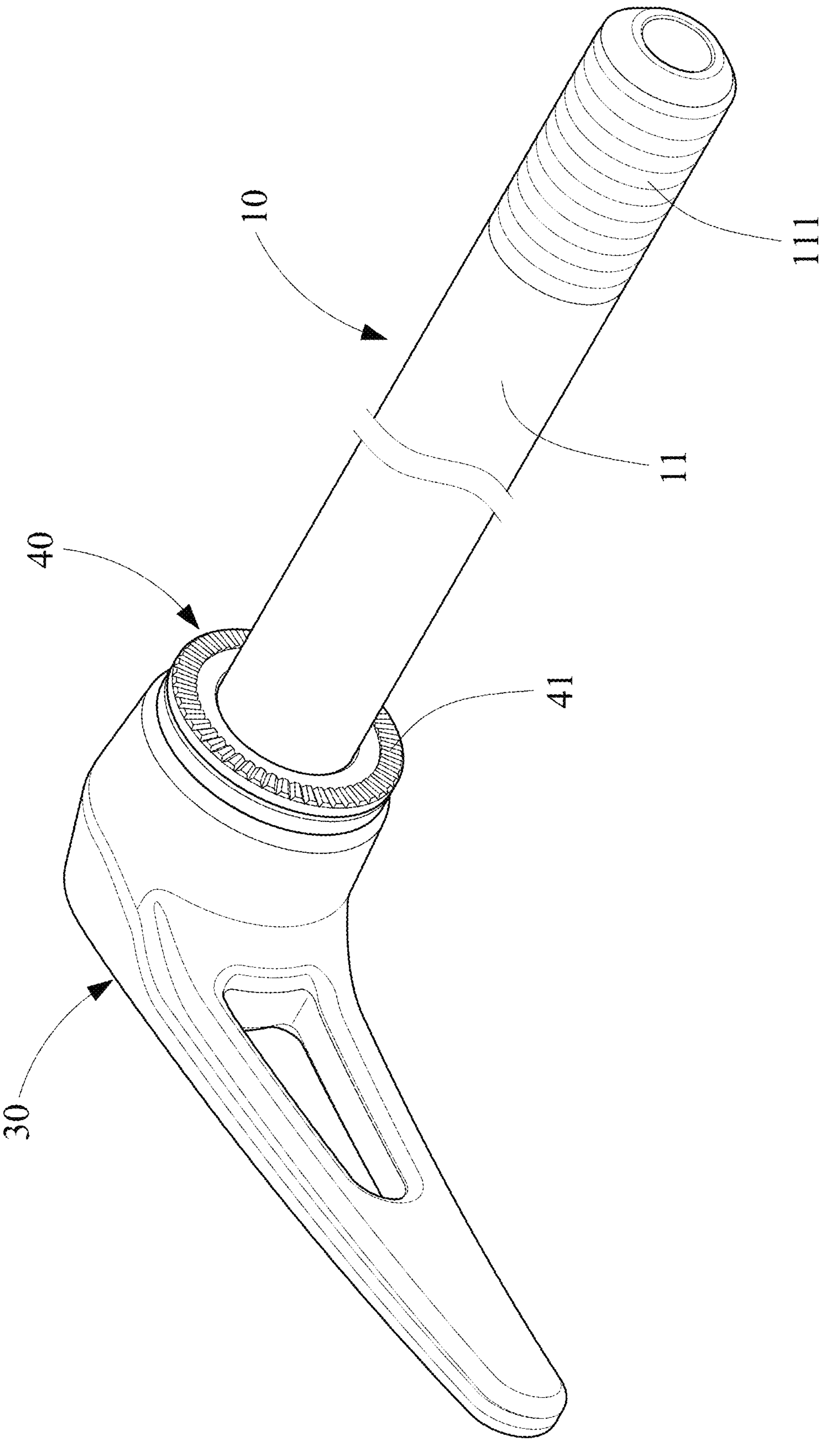
FIG. 1 is a perspective view of a skewer-wrench combination according to the preferred embodiment of the present invention.
Figure 2:
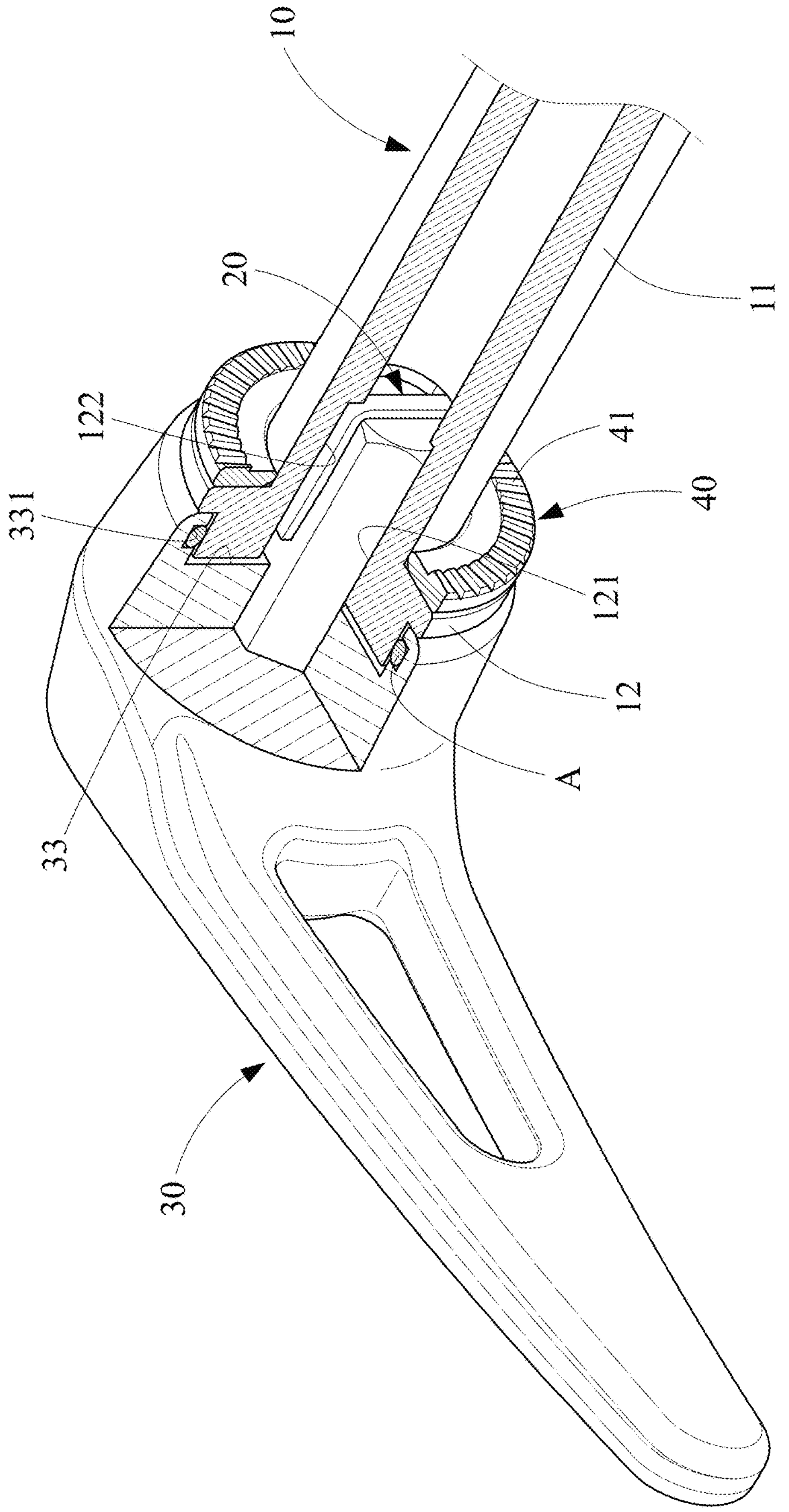
FIG. 2 is a cut-away view of the Skewer-wrench combination shown in FIG. 1.
Figure 3:
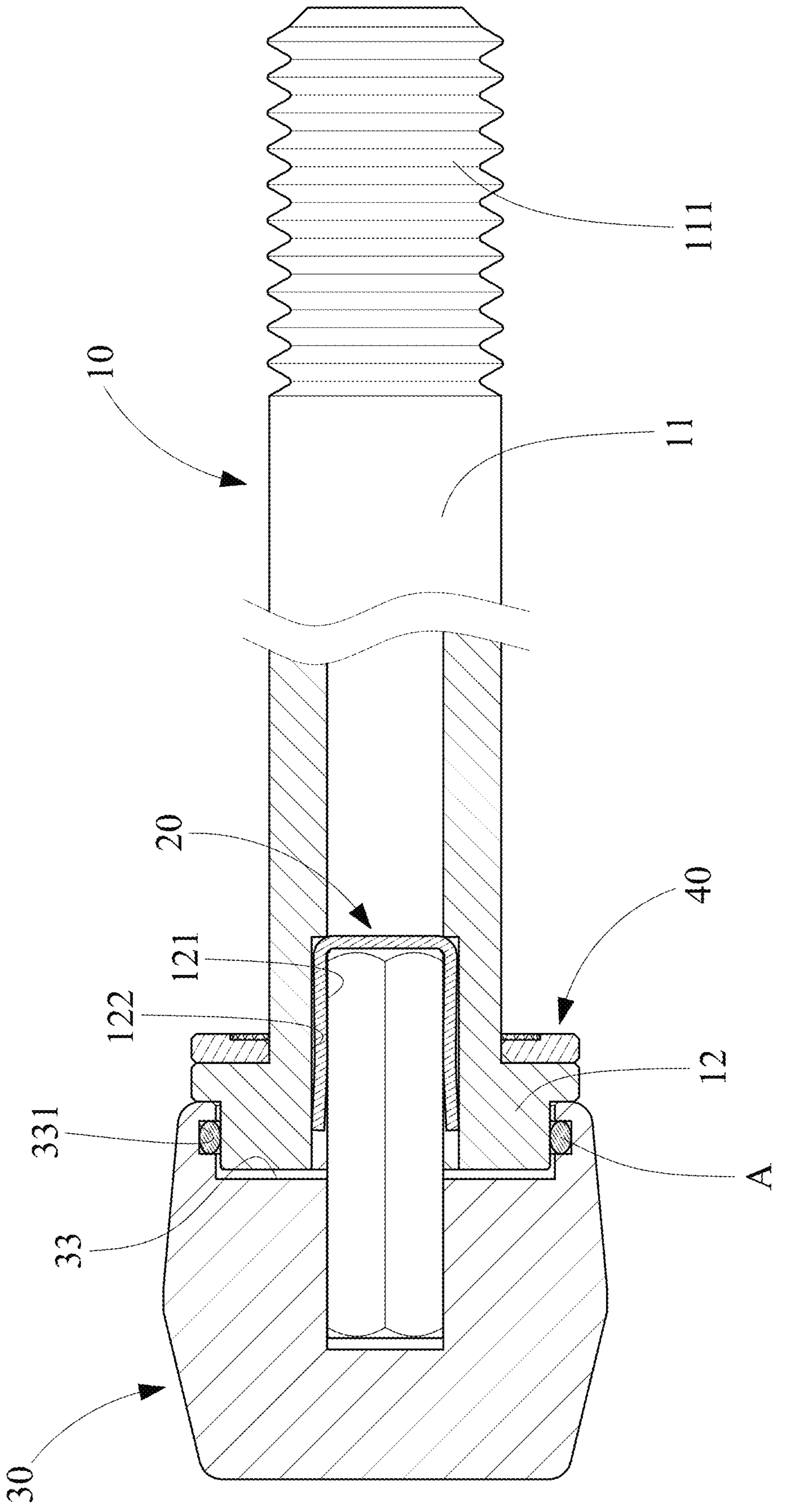
FIG. 3 is a cross-sectional view of the Skewer-wrench combination shown in FIG. 1.
Figure 4:
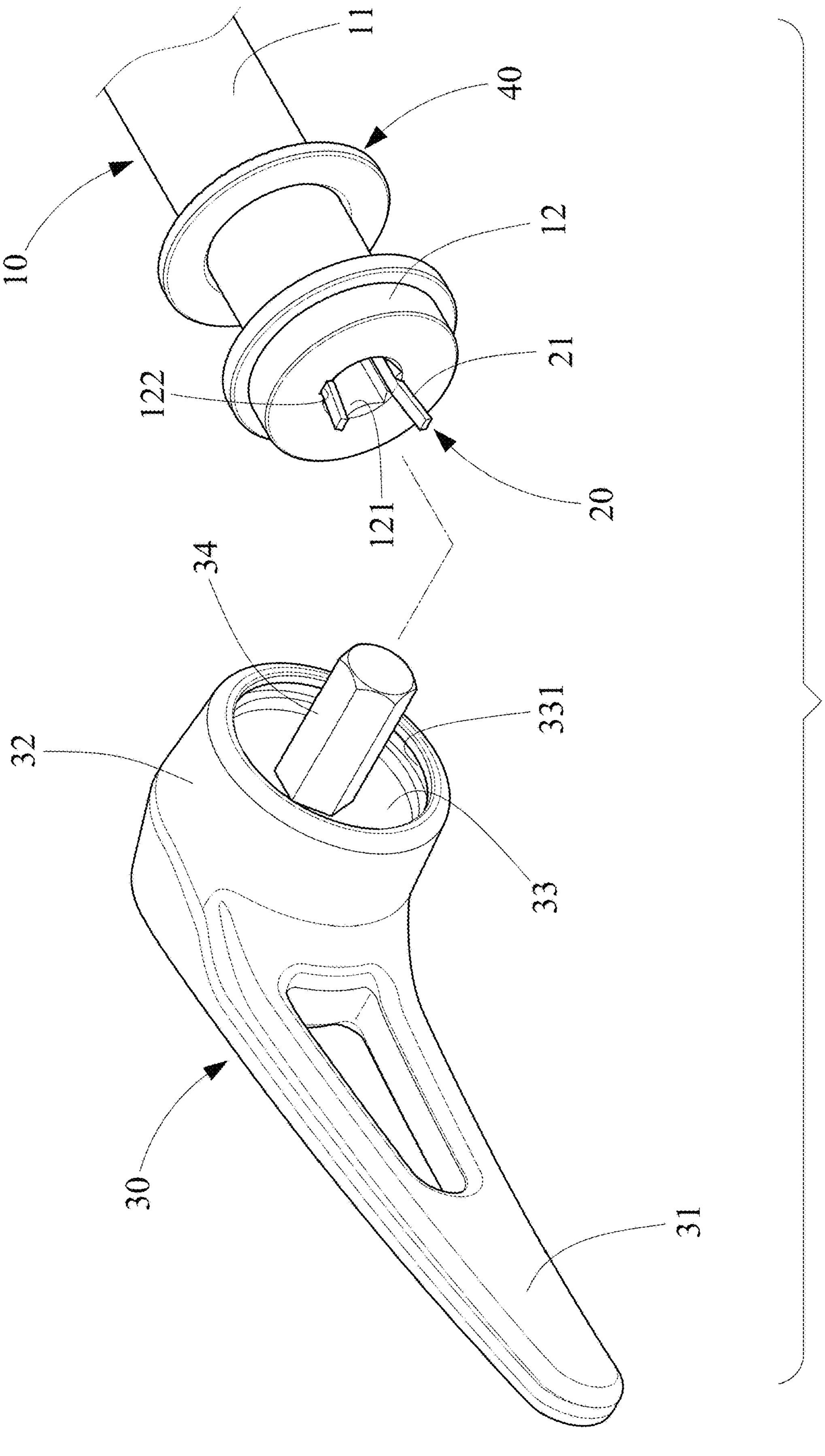
FIG. 4 is an exploded view of the Skewer-wrench combination shown in FIG. 1.
Figure 5:
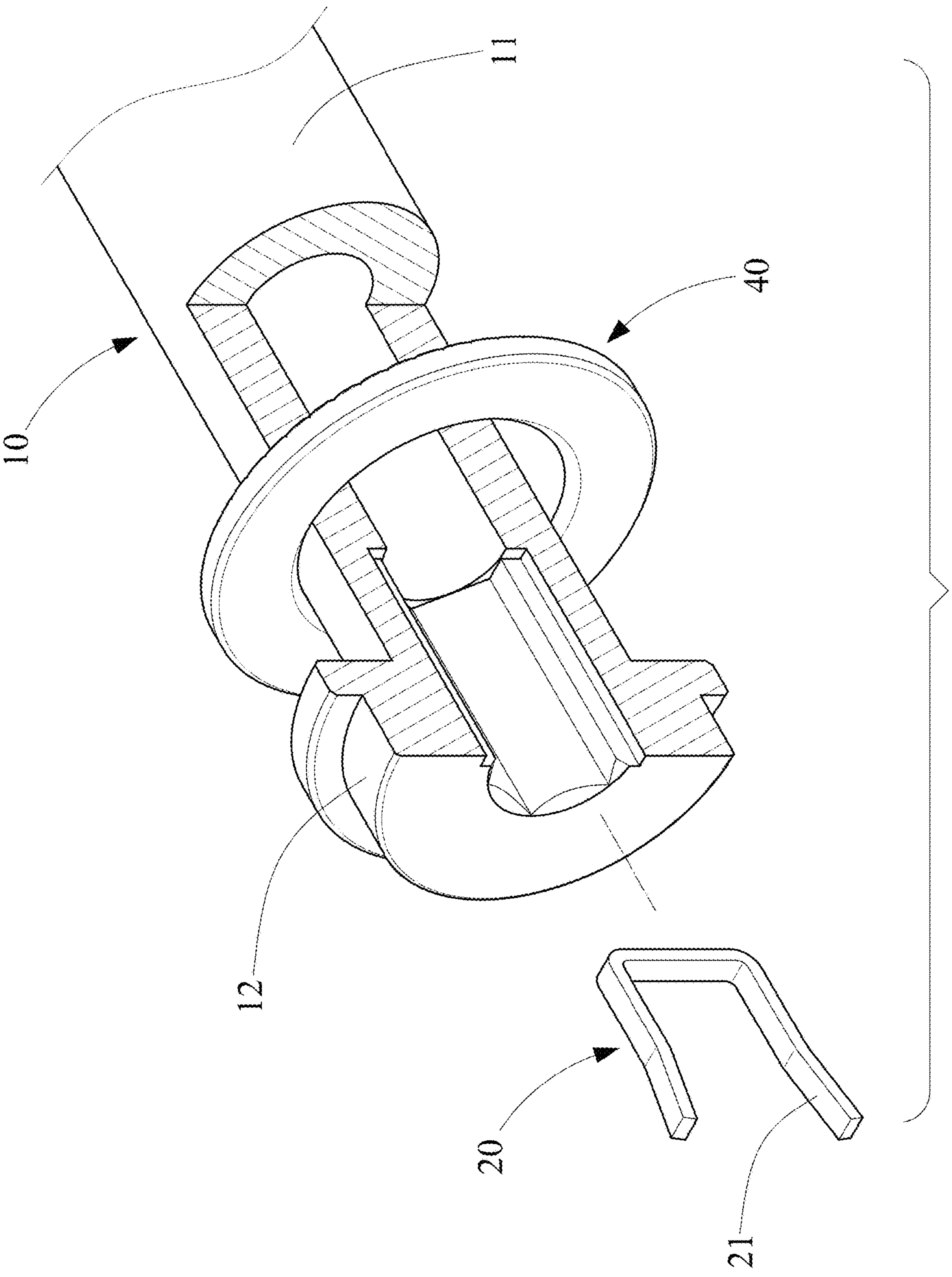
FIG. 5 is a cut-away view of a skewer of the Skewer-wrench combination shown in FIG. 1.
Figure 6:
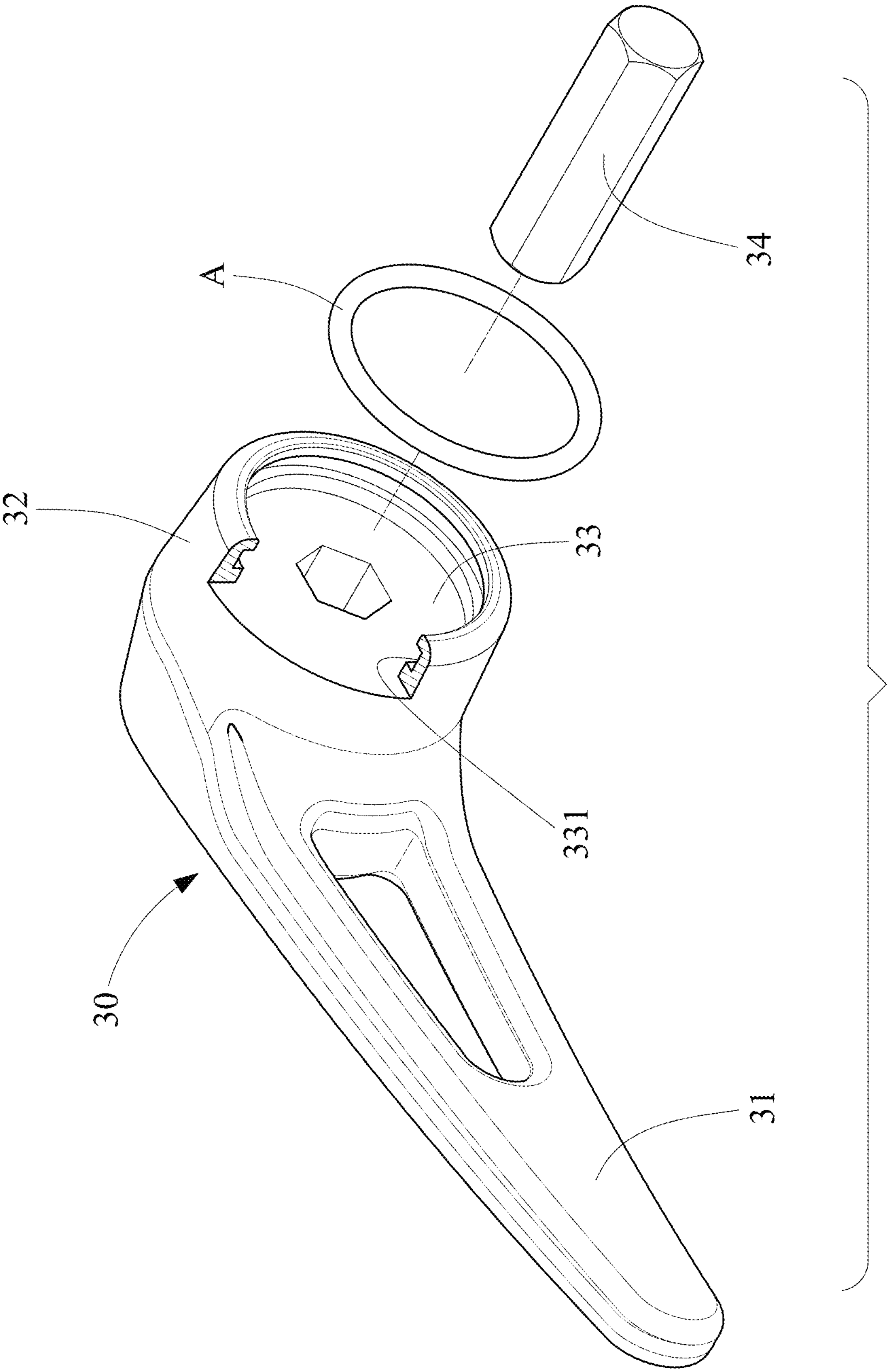
FIG. 6 is a cut-away view of a handle of the Skewer-wrench combination shown in FIG. 1.

Referring to FIGS. 1 and 6, a skewer-wrench combination a skewer 10, a compensator 20, a hex key 30 and a washer 40 according to the preferred embodiment of the present invention.

The skewer 10 includes a shank 11, a head 12, a thread 111, a non-circular bore 121 and two grooves 122.

The head 12 is formed at an end of the shank 11.

The thread 111 extends around an opposite end of the shank 11.

The non-circular bore 121 is made in the head 12. The non-circular bore 121 is preferably a polygonal bore.

The grooves 122 are made in the wall of the non-circular bore 121. The grooves 122 are located opposite to each other with respect to a center of the non-circular bore 121.

Preferably, the compensator 20 is a U-shaped leaf spring formed with two bent sections 21 so that the ends of the compensator 20 extend away from each other.

The hex key 30 includes a grip 31, a cap 32, a space 33 and a non-circular rod 34.

The grip 31 is to be handled by a user.

The cap 32 is formed at an end of the grip 31.

The space 33 is made in the cap 32. The space 33 is shaped in compliance with the head 12.

The non-circular rod 34 extends from a closed end of the cap 32. The non-circular rod 34 is shaped corresponding to the non-circular bore 121.

The annular groove 331 is made in an internal face of the cap 32, i.e., the wall of the space 33. The annular groove 331 receives an O-ring A.

The washer 40 extends around the shank 11. A face of the washer 40 is in contact with the head 12. An opposite face of the washer 40 is formed with an anti-skid face 41.

In operation, the shank 11 of the skewer 10 is inserted through an aperture made in a first branch of a fork of a bicycle (not shown). The thread 111 of the skewer 10 is inserted in a screw hole made in a second branch of the fork of the bicycle or inserted in a screw hole made in a nut (not shown) through an aperture of the second branch of the fork of the bicycle. Thus, the head 12 of the skewer 10 is in contact with the first branch of the fork of the bicycle.

The non-circular rod 34 of the hex key 30 is inserted in the non-circular bore 121 of the skewer 10 before the hex key 30 is operated to rotate the skewer 10 to bring the head 12 of the skewer 10 into tight contact with the first branch of the fork of the bicycle. Then, the hex key 30 is removed from the hex key 30. Thus, the orientation of the hex key 30 does not interfere with the operation of the skew 10 at all.

As mentioned above, the non-circular rod 34 is inserted in the non-circular bore 121 in operation. There is a gap (not numbered) between the non-circular rod 34 and the wall of the non-circular bore 121. The larger the gap is, the easier the insertion of the non-circular rod 34 is but the less reliable the operation of the non-circular rod 34 is. The smaller the gap is, the more reliable the operation of the non-circular rod 34 is but the more difficult the insertion of the non-circular rod 34 is.

To overcome the above-mentioned problem, the compensator 20 is inserted in the non-circular bore 121. Thus, it is allowed to make the gap between the non-circular rod 34 and the non-circular bore 121 large. Hence, the non-circular rod 34 is insertable in the non-circular bore 121, and the rotation of the skewer 10 with the hex key 30 is reliable because the gap is compensated by the compensator 20.

Moreover, the O-ring A is inserted in the space 33 of the hex key 30 to bring the cap 32 in tight contact with the head 12. The operation of the hex key 30 to rotate the skewer 10 is reliable.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The inventions claimed is:

1. A skewer-wrench combination comprising:

a skewer (10) comprising a thread (111) at an end, a non-circular bore (121) in an opposite end, and two grooves (122) in a wall of the non-circular bore (121);

a compensator (20) comprising two bent sections (21) fitted in the grooves (122); and a hex key (30) comprising a non-circular rod (34) compliant with the non-circular bore (121), wherein the non-circular rod (34) is smaller than the non-circular bore (121) so that the non-circular rod (34) is insertable in the non-circular bore (121), wherein the non-circular rod (34) is in tight contact with the bent sections (21) of the compensator (20) as the non-circular rod (34) is inserted in the non-circular bore (121).

2. The skewer-wrench combination according to claim 1, wherein the compensator (20) is a U-shaped leaf spring formed with the bent sections (21).

* * * * *